2 Sheets—Sheet 1.

G. SANDFORD.

Grinding Mill.

No. 670.

Reissued March 1, 1859.

N. PETERS. Photo-Lithographer, Washington, D. C.

G. SANDFORD.

Grinding Mill.

2 Sheets—Sheet 2.

No. 670.

Reissued March 1, 1859.

N. PETERS, Photo-Lithographer, Washington, D. C.

UNITED STATES PATENT OFFICE.

GELSTON SANFORD, OF POUGHKEEPSIE, NEW YORK.

IMPROVEMENT IN GRINDING MILLS.

Specification forming part of Letters Patent No. 19,587, dated March 9, 1858; Reissue No. 670, dated March 1, 1859.

*To all whom it may concern:*

Be it known that I, GELSTON SANFORD, of Poughkeepsie, in the county of Dutchess and State of New York, have invented a new and valuable Improvement in Grinding-Mills; and I do hereby declare that the following is a full and exact description thereof, reference being had to the accompanying drawings, and to the letters of reference marked thereon.

The nature of my invention consists in making a grinding-mill with flat plates, whose flat surfaces are corrugated or made rough, and which grind by means of a compound motion, both longitudinally and oscillating up and down, which motion is produced by a crank. There are a series of plates, so that one movable plate acts between two stationary plates, all having a rough surface for grinding, dressed in any form best adapted for different kinds of work.

Figure 1:
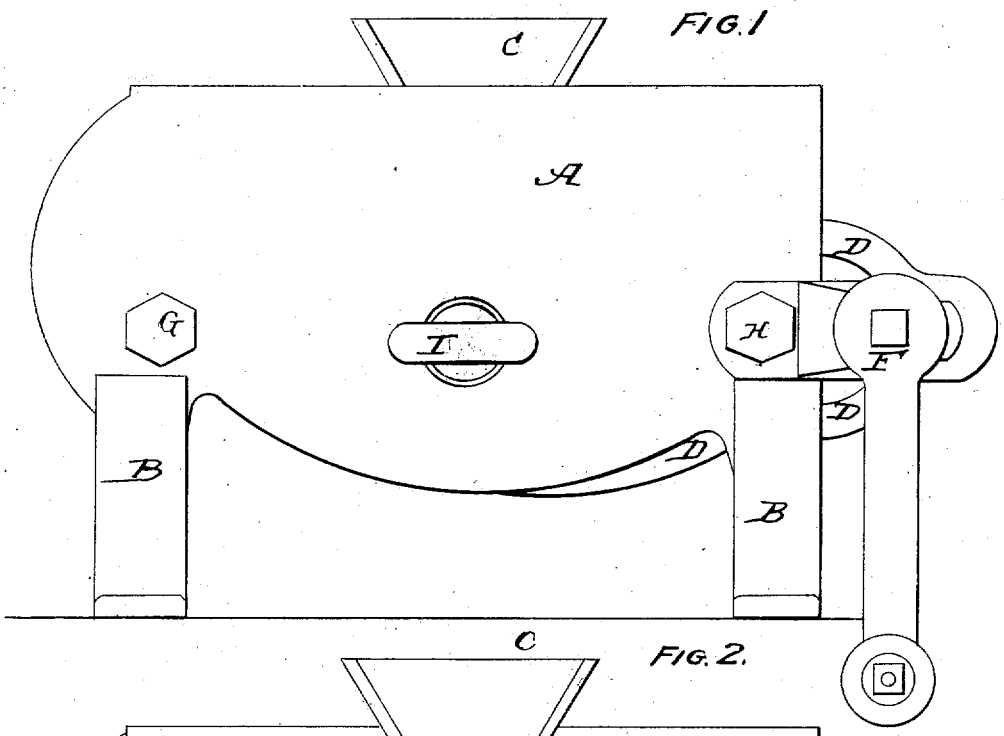
Figure 2:
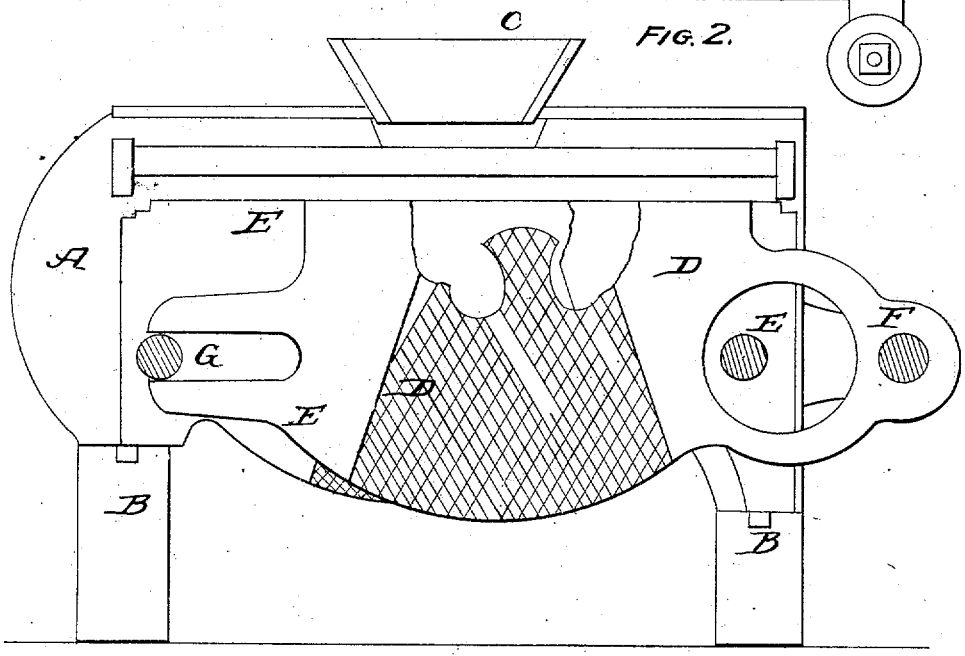
Figure 3:
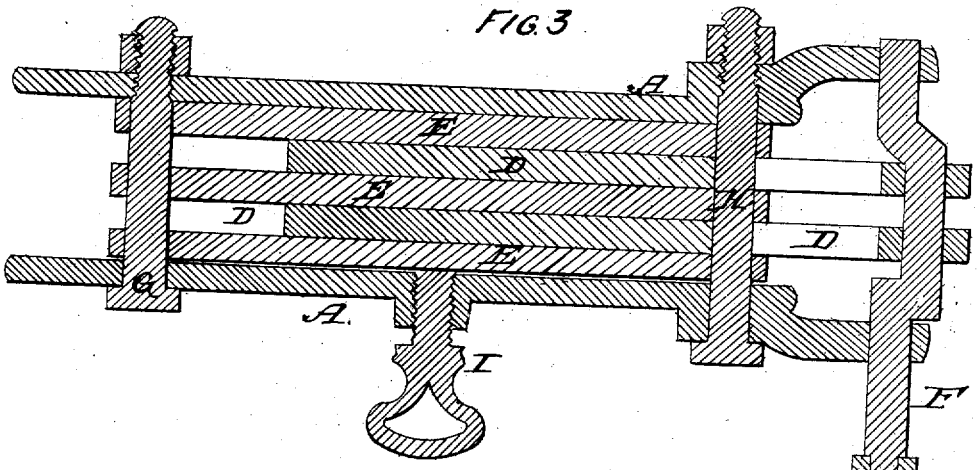
Figure 4:
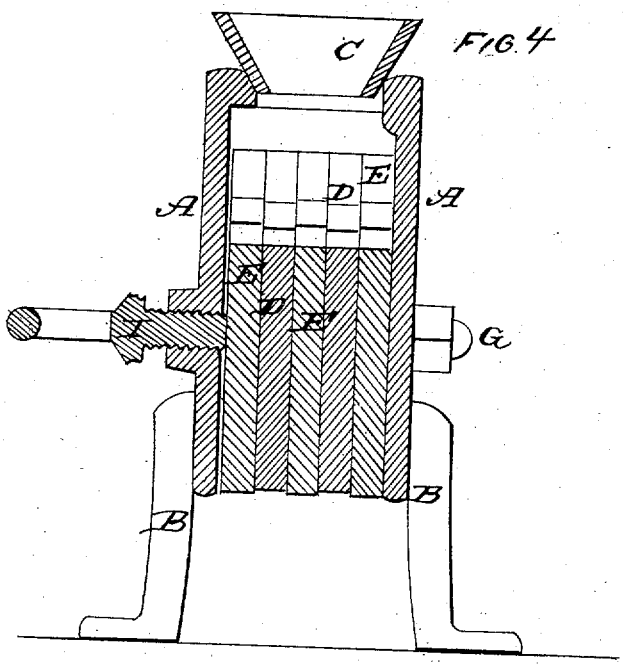

In the accompanying drawings, Figure 1 is a side elevation of my improvement in grinding-mills. Fig. 2 is a longitudinal sectional elevation of it. Fig. 3 is a horizontal section of it, and Fig. 4 is a transverse sectional elevation of it.

A A are side plates of the mill, which I usually make of cast-iron.

B B are the legs by which the plates A are supported.

C is the hopper, and D D E E E are the grinding-plates, made of cast-iron. The plates E are stationary, except as to the adjustment necessary to regulate the fineness or quality of the article ground. The plates D have both a longitudinal and vibratory or oscillating motion given to them by turning the crank or crank-shaft F, to which one end of these plates is attached. The other end is slotted and slides upon the bolt G, as shown more clearly in Fig. 2, or a slot may be made in the upper part of the plate in an oval shape, through which the bolt should pass, and a bearing would be formed, and the compound motion would be attained. There is an opening in the plates D, around the bolt H, to allow them to slide and vibrate without being arrested by the bolt. The upper edges of the plates D and E are notched, as represented, to insure the breaking of the coarser particles and the introduction of their fragments between the plates, which the notched form of the upper edge of the plates and their compound motion are, when combined, admirably designed to accomplish. The vertical motion of the plates D serves to bring the coarser particles where they cannot fail to be crushed by their longitudinal motion.

The fineness or quality of the article ground is regulated by the set-screw I, by which the plates may be held at the proper distance from each other.

I make the frame or box in which the plates are placed of cast-iron, and the number of the plates may be indefinitely increased, and the motion to them given by a double crank.

This mill should be made with a suitable balance-wheel, and may be used either as a hand-mill or with power, and is adapted to all or most kinds of grinding, particularly all kinds of grain, both for domestic uses and for feed, and also for grinding paints, bones, plaster, coffee, pepper, and spices.

Having thus fully described my improvement and the operation thereof, what I claim is—

1. Constructing a grinding-mill with flat plates dressed on both sides, having a longitudinal, reciprocating, vertical, and oscillating motion, in combination with flat stationary plates likewise dressed on both sides, the whole constructed and operated substantially as described.

2. The notched form of the upper edges of the plates, for the purpose of preventing the mill from choking, and to facilitate the feeding of the article to be ground between the grinding-surfaces, as described.

GELSTON SANFORD.

Witnesses:

THOMAS HULL,
ADOLPH M. BRUSH.